Feb. 26, 1957 D. C. EMMERT ET AL 2,782,458
METHOD AND APPARATUS FOR PRODUCING FLAT
FIBERGLASS REINFORCED PLASTIC PANELS
Filed Dec. 7, 1954 2 Sheets-Sheet 1
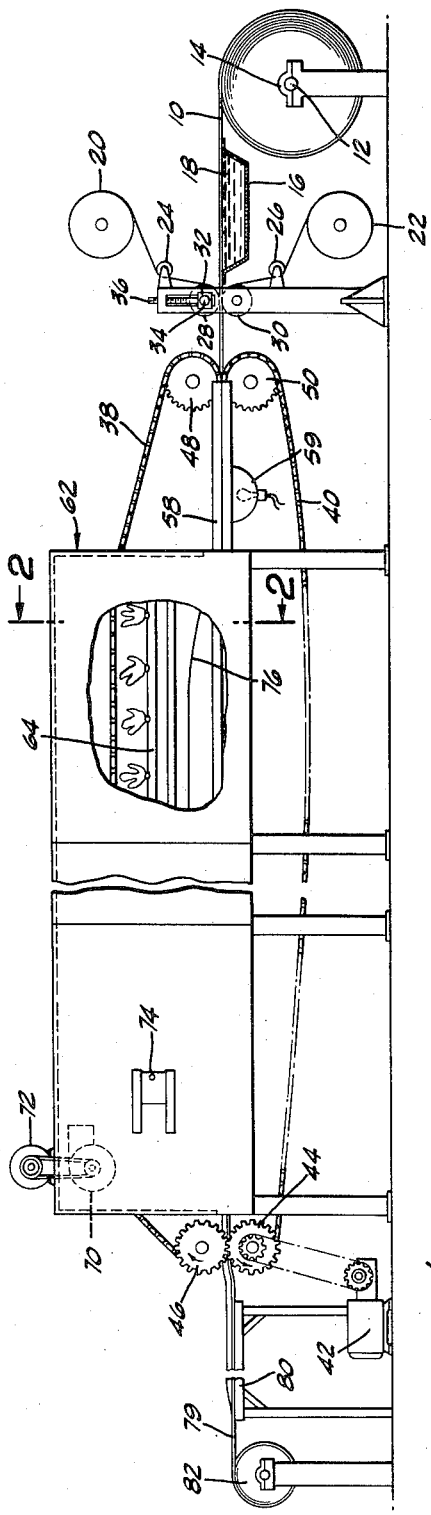
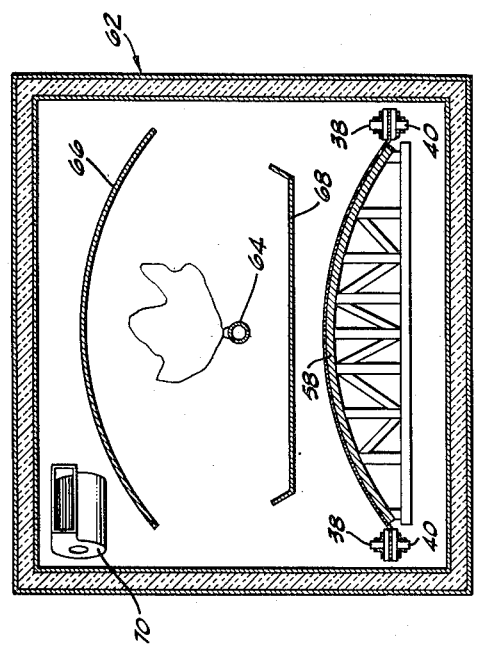
DALE C. EMMERT
KENNETH E. VAIL
INVENTORS
BY
ATTORNEY.

Feb. 26, 1957  D. C. EMMERT ET AL  2,782,458
METHOD AND APPARATUS FOR PRODUCING FLAT
FIBERGLASS REINFORCED PLASTIC PANELS
Filed Dec. 7, 1954   2 Sheets-Sheet 2

DALE C. EMMERT
KENNETH E. VAIL
INVENTORS

BY

ATTORNEY.

United States Patent Office 2,782,458
Patented Feb. 26, 1957

2,782,458

METHOD AND APPARATUS FOR PRODUCING FLAT FIBERGLASS REINFORCED PLASTIC PANELS

Dale C. Emmert, El Monte, and Kenneth E. Vail, Rosemead, Calif.

Application December 7, 1954, Serial No. 473,712

16 Claims. (Cl. 18—1)

Our present invention relates to the production of fiberglass reinforced plastic panels, and it relates particularly to a method and apparatus for the continuous production of long sheets of flat fiberglass reinforced plastic panels.

It is well known in the art to produce generally flat fiberglass reinforced plastic panels by a molding procedure in which a plurality of plastic impregnated fiberglass sheets are laminated one upon the other, with suitable aluminum or other separators, and then are simultaneously cured in a large oven or curing room. In order to prevent boiling of the plastic around the edges in this prior art curing operation, the heat had to be applied very slowly, so that the curing operation required a relatively long time. Any misapplication of this prior art procedure generally caused all of these stacked panels to be ruined.

Because of the long curing time and the high rejection rate of this prior art method of producing generally flat fiberglass reinforced plastic panels, it has long been considered desirable in the art to provide a method and apparatus for the continuous production of long sheets of flat fiberglass reinforced plastic panels. However, such a continuous process and apparatus therefor have heretofore been impractical because of the wrinkling which normally occurs when plastic impregnated fiberglass mats are subjected to a relatively fast cure.

It is therefore an object of our present invention to provide a method and apparatus for producing flat fiberglass reinforced plastic panels in a continuous operation.

It is another object of our present invention to provide a method and apparatus for producing flat fiberglass reinforced plastic panels in which a relatively quick curing operation may be applied to greatly reduce the time required for producing such panels.

Another object of our present invention is to provide a method and apparatus for producing flat fiberglass reinforced plastic panels in which sufficient pressure is applied to the plastic impregnated fiberglass matting during the curing operation to prevent undesirable wrinkling.

Another object of our present invention is to provide a method and apparatus for producing flat fiberglass reinforced plastic panels in which the plastic impregnated fiberglass matting is disposed between cellophane sheets which are gripped along their edges, and in which said cellophane enclosed matting is passed over an arched table in order to apply the necessary pressure to the impregnated matting during the curing operation to prevent undesirable wrinkling.

Another object of our present invention is to provide a method and apparatus for producing flat fiberglass reinforced plastic panels in which the amount of ripple in the finished panels may be controlled.

A further object of our present invention is to provide a method and apparatus for the continuous production of flat fiberglass reinforced plastic panels in which a misapplication of the process will only cause injury to a relatively small amount of materials.

Other objects and advantages of our present invention will be apparent from the following description and claims, the novelty of my invention consisting in the features of construction, the combinations of parts, the novel relations of the members and the relative proportioning, dispostion and operation thereof, all as is more completely described herein and as is more particularly pointed out in the appended claims.

In the accompanying drawings, forming a part of our present specification:

Figure 1 is a side elevation, partly in section, showing our apparatus in operation.

Figure 2 is a vertical section along the line 2—2 in Figure 1 showing our preferred oven construction and details of our chain drive and arched table construction.

Figure 3:
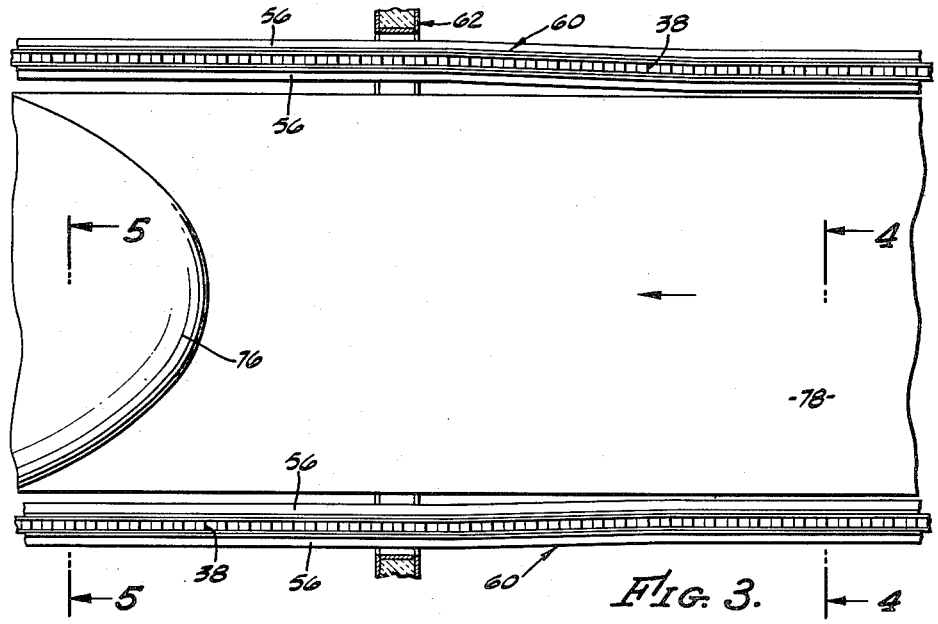
Figure 3 is a plan view of our table and chain drive mechanism.

Referring to the drawings, we provide a continuous fiberglass mat 10, preferably of 100 to 200 feet in length, and with a preferred width of 3 feet 8 inches. A suitable fiberglass mat 10 is the Owens-Corning Treatment 16 Random Weave fiberglass mat which is bound together by a sprayed soluble polyester binder, although other fiberglass mats may be used. Mat 10 is provided from a roll of matting 11 that is rotatably mounted on a shaft 12 supported in suitable bearings 14.

Mat 10 is impregnated with plastic by being passed through a dip tank 16 which contains a suitable bath 18 of liquid plastic. Bath 18 preferably contains a combination of a liquid polyester resin, a liquid styrene, suitable coloring and catalysts to accelerate the later heat curing operation. A preferred liquid polyester resin is Selectron 5051A, produced by the Pittsburgh Plate Glass Co. Since the contents of the bath 18 and the temperatures used in the curing oven are interdependent, our preferred components for bath 18 will be given below in connection with our preferred heating cycle.

The impregnated mat 10 next has both sides covered with sheets of cellophane, the upper and lower sheets of cellophane being provided from rolls 20 and 22, respectively, passing over respective tension rollers 24 and 26, and then being applied to the mat 10 over spacing rollers 28 and 30, respectively.

Adjustable bushings 32 support the axle 34 of spacing roller 28, and a conventional threaded adjusting rod 36 is operatively connected to adjustable bushings 32 to permit adjustment of the spacing between rollers 28 and 30.

The spacing between rollers 28 and 30 is adjusted to provide an impregnated mat of the desired thickness, to control thickness of the finished panels. The finished panels generally have a thickness of between 45 and 150 thousandths of an inch.

The excess liquid resin is squeezed out of mat 10 by rollers 28 and 30, normally flowing back into bath 18, and this squeezing operation between roller 28 and 30 squeezes out all air bubbles which may otherwise have been present in the mat 10.

The cellophane sheets are somewhat wider than the mat 10, to permit the cellophane to be gripped at each side of the mat between upper and lower drive chains 38 and 40, respectively.

A suitable chain drive motor 42 is provided, preferably at the rear end of the apparatus, and motor 42 is in driving engagement with a drive gear 44, which in turn is in driving engagement with a gear 46 having the same number of teeth as gear 44. Chains 38 are driven clockwise in Figure 1 by suitable driving engagement with gear 46, and the lower chains 40 are driven anti-clockwise in Figure 1 by suitable engagement with gear 44.

Chains 38 and 40 are adjustable so that they may be perfectly matched, and are fed into operative engagement with the cellophane at the edges of mat 10 by means of sprockets 48 and 50.

Figure 6:
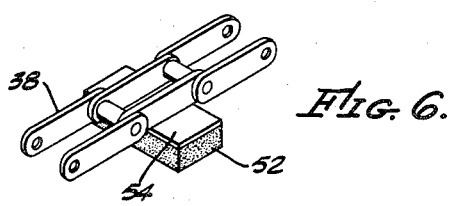
Figure 6 is a perspective view showing our preferred chain construction with a gripping cleat attached.

In order to provide a positive gripping engagement between the chains 38 and 40 and the cellophane at the edges of mat 10, we provide a plurality of rubber cleats 52 on chains 38 and 40, cleats 52 being supported by means of suitable cleat support plates 54 that are integrally connected to the chain link members in the manner best shown in Figure 6 of the drawings. We prefer to place rubber cleats 52 on every fourth chain link.

Figure 4:
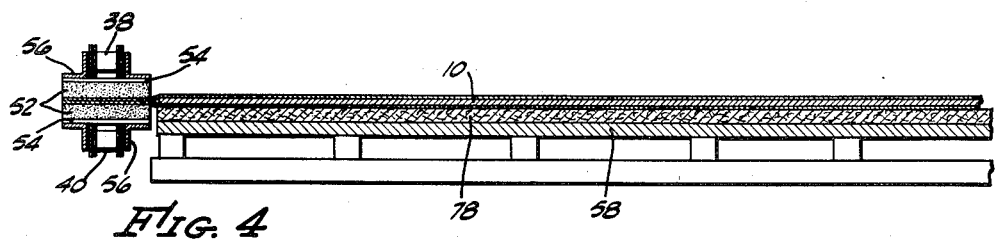
Figure 4 is a vertical section along the line 4—4 of Figure 3 showing our preferred table and chain drive construction at the flat portion of the table.
Figure 5:
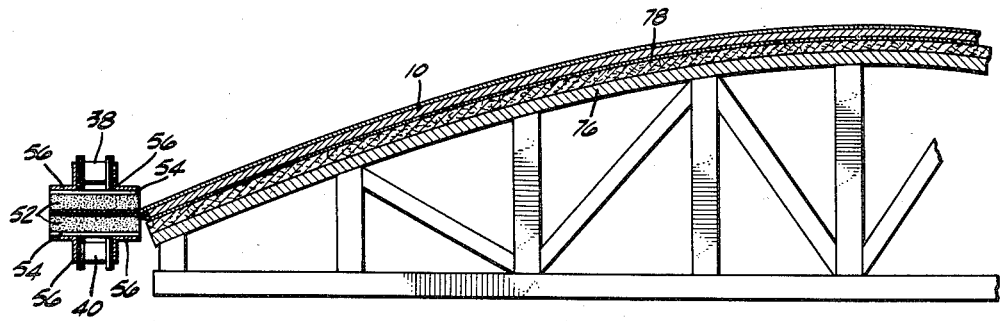
Figure 5 is a vertical section along the line 5—5 of Figure 3 showing the arched portion of our table.

The chains 38 and 40 at each side of the mat 10 are run between spaced rails 56 in the manner best shown in Figures 2, 4 and 5, to compress the matching cleats of the respective chains 38 and 40 against the exposed cellophane at each side of the mat. This causes the cellophane to be tightly gripped at regular intervals on both sides of the mat during the entire course of the mat through the oven.

This chain drive mechanism draws the cellophane covered, plastic impregnated mat 10 over the work table 58. Before the mat 10 is moved into the oven, it passed over a light source 59 which permits the cellophane covered, impregnated mat 10 to be inspected from above.

Just before the mat is moved into the oven, the chain guide rails 56 diverge outwardly at 60 a sufficient amount to tighten the cellophane covering on the mat, and from this point onward, the rails 56 are substantially parallel.

After the cellophane sheets have thus been tightened about the impregnated mat 10, the mat is moved into the oven 62, which preferably consists of an elongated passage which is divided into a plurality of sections, with a burner 64 disposed in each of the sections. In our preferred oven 62, there are four separate oven chambers, with four corresponding burners 64.

A baffle plate 66 is disposed above each burner 64 to prevent injury to the top of the oven, and to deflect the heat downwardly in the general direction of the mat. Similarly, a baffle plate 68 is disposed below each of the burners 64 to prevent heat from radiating directly downwardly from the burner flame on to the mat.

Each of the burners 64 is thermostatically maintained at the desired temperature so that the curing operation will be uniform. The mat is moved through the oven at a constant rate, which will depend upon the amount of heat applied, the nature of the resin, including the catalysts used, and the mat thickness.

Although we have shown the oven heating apparatus as a plurality of gas burners 64, it is to be understood that any other conventional type of heating unit may be used.

A blower 70, driven by a suitable motor 72, is disposed in each furnace section to circulate the hot gasses therein. Blowers 70 are preferably disposed so that they blow the gasses diagonally across the upper portion of each furnace section.

In order to best control the temperature within each of the furnace sections, a partition (not shown) is disposed between each of the adjacent oven sections, these partitions coming to within several inches of the table 58.

Operating conditions within the oven may be viewed through suitable viewing windows 74 in the side of the oven 62.

Just inside of the oven (preferably about 18 inches) the top of work table 58 commences to take the shape of an arch, this arch gradually increasing until it achieves a height of approximately 4 inches. The gradual rise of the arch 76 is preferably extended over a length of about 6 feet along table 58.

Arch 76 causes a further stretching or tightening of the cellophane about the mat, and causes the upper sheet of cellophane to apply a downward pressure against the mat to hold the mat flat against the work table 58, thus keeping wrinkles in the mat at a minimum.

In addition to the tightening of the cellophane sheets by the spreading of the drive chains at 60, and by means of arch 76, the cellophane is further tightened to apply more pressure against the mat as it passes over arch 76 by the shrinking effect of the heat in oven 62 on the cellophane.

If more ripple is desired in the finished sheet, the temperature in the first oven section is increased, in order to hasten the jelling of the resin before the cellophane is stretched over the arch 76.

If, on the other hand, the amount of ripple is to be decreased, the temperature of the first section of oven 62 may be decreased, to permit the cellophane to compress the mat over arch 76 before too much jelling in the plastic has occurred.

If most of the ripple is to be eliminated, a pre-shrinking operation may be applied to the cellophane before the cellophane is applied to the mat so that when the mat and cellophane passes over the arch 76, a maximum of downward pressure will be exerted on the mat. Such a pre-shrinking operation may be accomplished by passing the cellophane through suitable heating units (not shown) before the cellophane is applied to the mat.

In addition to the functions heretofore attributed to the cellophane, of providing a means of locomotion for the mat and of providing a means for compressing the mat down against the arched work table 58, the cellophane also keeps the air away from the plastic as the plastic is being cured in order to provide a tack-free surface on the finished article.

Although the temperatures of the four successive oven sections will vary according to mat thickness, material used and the rate at which the mat is moved through the oven, the following are preferred compositions for various colored panels, with the preferred temperatures for the four successive oven sections, the temperatures holding true only for producing panels between 45 and 150 thousandths of an inch. The mat is presumed to move through the oven at the rate of 3 feet per minute. If thicker panels are to be produced, the first, second and fourth oven sections will have a slightly higher temperature (on the order of 10° F. higher). With thicker mats, different catalytic systems may be used.

Opaque Light Green:
    80% Selectron 5051A
    20% styrene
    .7% color
    .5% benzolperoxide (catalyst)
    .5% cumene hydroperoxide (catalyst)
    Oven temperatures: 195°, 150°, 160°, 200° F.

Opaque Dark Green:
    Same as for light green.

Opaque Blue:
    80% Selectron 5051A
    20% styrene
    .6% color
    .5% benzolperoxide (catalyst)
    .8% cumene hydroperoxide (catalyst)
    Oven temperatures: 195°, 150°, 160°, 220° F.

Opaque White:
    80% 5051A
    20% styrene
    1% color
    .5% benzolperoxide (catalyst)
    1% cumene hydroperoxide (catalyst)

Oven temperatures: same as for blue.
Opaque Yellow:
  80% 5051A
  20% styrene
  1% color
  .5% benzolperoxide (catalyst)
  1% cumene hydroperoxide (catalyst)
  .02% cobalt naphthanate 6% solution (catalyst).
  Oven temperatures: 195°, 160°, 165°, 220° F.
Opaque Red:
  80% 5051A
  20% styrene
  .5% benzolperoxide (catalyst)
  1% menthol ethyl ketone peroxide (D. D. M.)
  .02% cobalt naphthanate 6% solution
  Oven temperatures: 195°, 160°, 165°, 210° F.

The catalysts in the above compositions cause an exothermic chemical reaction within the composition which heats the plastic and would, if given sufficient time, cause complete curing of the plastic. The oven 62 greatly accelerates the curing time of the catalyst. Because of the exothermic reaction, the temperature of the first oven section is hotter than the temperatures for the second and third oven sections, which keeps the plastic from getting too hot during the peak of the exothermic reaction. The final oven section is hotter, completing the curing operation.

The surface of work table 58 is preferably covered with felt 78 which has a low coefficient of friction with cellophane, thus permitting the cellophane covered mat to slide easily along the arched portion 76 of work table 58.

The finished sheet of fiberglass reinforced plastic panelling 79 moves out of the rear end of oven 62, and flattens out along cooling table 80 which is sufficiently long to permit the finished sheet 79 to cool in a flat position (preferably ten (10) feet or more in length). Since the plastics used in our preferred compositions are thermo-setting, the finished panels 79 are fully set when they pass out of oven 62 onto table 80.

After the finished sheet 79 has cooled on table 80, it may then be wound into a roll 82 for shipping purposes. The upper and lower cellophane sheets may be stripped off of the finished sheet 79 either before or after shipping, and similarly, the rough edges of the finished sheet 79 may be trimmed either before or after shipping. Only about one (1) inch need be trimmed from each side of the finished sheet to eliminate all edge irregularities, thus providing a minimum of wastage.

Our present method and apparatus for producing flat fiberglass reinforced plastic panels in a continuous process has several important advantages over prior art methods and apparatus for producing flat fiberglass panels. First, the production rate is greatly speeded up by our method and apparatus thus substantially reducing production costs and effort. Second, there is far less likelihood of injury or damage to the panels as they are being fabricated, and in the event of any injury to any portion of the panels, only a small section need be rejected, and not a large number of stacked panels.

The production of long, continuous panels under carefully controlled conditions by our method and apparatus greatly reduces rejects over all prior art methods and apparatus, thus further reducing production costs.

Another advantage of our method and apparatus over prior art methods and apparatus is that the uniform conditions which we apply to all portions of our panels result in a high degree of uniformity in the panels.

The rapid curing operation which we effect considerably reduces the migrating of pigments toward the glass fibers in the panels, thus producing a better product with less concentrations of pigment in it. Similarly, the rapid curing time reduces migration of the styrene to the surface, therefore producing a more glossy surface which will withstand weathering a great deal better than prior panels.

It is to be understood that the form of our invention herein shown and described is our preferred embodiment and that various changes in the shape, size, arrangement of parts and method steps may be resorted to without departing from the spirit of our invention, or the scope of our appended claims.

We claim:

1. Apparatus for producing a fiber reinforced plastic panel including a fiber mat source of supply, means for impregnating said mat with plastic, means for covering a surface of said impregnated mat with a flexible sheet, an elongated curing oven, an elongated working surface disposed longitudinally within said oven, said working surface being arched from one of its sides to its other side to provide an elongated hump disposed longitudinally within said oven, conveyer means for drawing said impregnated mat longitudinally over said arched surface in said oven, and gripping means operatively engageable with said flexible covering at the opposite sides of said arched surface to apply lateral tension to said covering whereby said impregnated mat is compressed by said covering against said arched surface during the curing operation to produce a substantially flat panel.

2. Apparatus for producing a fiber reinforced plastic panel including a fiber mat source of supply, means for impregnating said mat with plastic, means for covering a surface of said impregnated mat with a flexible sheet, an elongated curing oven, an elongated working surface disposed longitudinally within said oven, said working surface being arched from one of its sides to its other side to provide an elongated hump disposed longitudinally within said oven, conveyer means adapted to engage the opposite edges of said flexible covering along the opposite sides of said arched surface for simultaneously drawing said impregnated mat longitudinally over said arched surface in said oven and applying lateral tension to said covering, whereby said flexible covering will compress said mat against said arched surface during the curing operation to produce a substantially flat panel.

3. Apparatus for producing a fiber reinforced plastic panel including a fiber mat source of supply, means for impregnating said mat with plastic, means for covering both sides of said impregnated mat with a flexible sheet, an elongated curing oven, an elongated working surface disposed longitudinally within said oven, said working surface being arched from one of its sides to its other side to provide an elongated hump disposed longitudinally within said oven, conveyer means adapted to engage the opposite edges of said flexible coverings along the opposite sides of said arched surface for simultaneously drawing said impregnated mat longitudinally over said arched surface in said oven and applying lateral tension to said coverings, whereby said impregnated mat is compressed during the curing operation to produce a substantially flat panel.

4. Apparatus for producing a fiber reinforced plastic panel including a fiber mat source of supply, means for impregnating said mat with plastic, means for covering both sides of said impregnated mat with a flexible sheet, an elongated curing oven, an elongated working surface disposed longitudinally within said oven, said working surface being arched from one of its sides to its other side to provide an elongated hump disposed longitudinally within said oven, a pair of opposed conveyer chains on each side of said arched surface adapted to engage said flexible coverings along their edges for simultaneously drawing said impregnated mat longitudinally over said arched surface in said oven and applying lateral tension to said coverings, whereby said impregnated mat is compressed during the curing operation to produce a substantially flat panel.

5. Apparatus for producing a fiber reinforced plastic panel including a fiber mat source of supply, means for impregnating said mat with plastic, means for covering a surface of said impregnated mat with a flexible sheet, an elongated working surface arched from one of its sides to its other side to provide an elongated hump disposed longitudinally along said working surface, conveyor means for drawing said impregnated mat longitudinally over said arched surface, means for curing said mat while said mat is being drawn over said arched surface, and gripping means operatively engageable with said flexible covering at the opposite sides of said arched surface to apply lateral tension to said covering whereby said impregnated mat is compressed by said covering against said arched surface during the curing operation to produce a substantially flat panel.

6. Apparatus for producing a fiber reinforced plastic panel including a fiber mat source of supply, means for impregnating said mat with plastic, means for covering a surface of said impregnated mat with a flexible sheet, an elongated working surface arched from one of its sides to its other side to provide an elongated hump disposed longitudinally along said working surface, conveyor means adapted to engage the opposite edges of said flexible covering along the opposite sides of said arched surface for simultaneously drawing said impregnated mat longitudinally over said arched surface and applying lateral tension to said covering, whereby said flexible covering will compress said mat against said arched surface, and curing means for curing said mat while said mat is moving along said arched surface.

7. Apparatus for producing a fiber reinforced plastic panel including a fiber mat source of supply, means for impregnating said mat with plastic, means for covering both sides of said impregnated mat with a flexible sheet, an elongated curing oven, an elongated working surface disposed longitudinally within said oven, said working surface being arched from one of its sides to its other side to provide an elongated hump disposed longitudinally within said oven, a pair of opposed conveyer chains on each side of said arched surface, said chains having a plurality of rubber cleats affixed thereto at substantially regular intervals to engage said flexible coverings along their edges for simultaneously drawing said impregnated mat longitudinally over said arched surface in said oven and applying lateral tension to said coverings, whereby said impregnated mat is compressed during the curing operation to produce a substantially flat panel.

8. Apparatus for producing a fiber reinforced plastic panel including a fiber mat source of supply, means for impregnating said mat with plastic, means for covering both sides of said impregnated mat with a flexible sheet, an elongated curing oven, an elongated working surface disposed longitudinally within said oven, said working surface being arched from one of its sides to its other side to provide an elongated hump disposed longitudinally within said oven, a pair of opposed conveyor chains on each side of said arched surface adapted to engage said flexible coverings along their edges for simultaneously drawing said impregnated mat longitudinally over said arched surface in said oven and applying lateral tension to said coverings, whereby said impregnated mat is compressed during the curing operation to produce a substantially flat panel, the separation between said conveyor chains increasing after said flexible coverings have been engaged by said conveyer chains to increase the compression of said impregnated mat during the curing operation.

9. Apparatus for producing a fiber reinforced plastic panel including a fiber mat source of supply, means for impregnating said mat with plastic, means for covering both sides of said impregnated mat with cellophane, an elongated curing oven, an elongated working surface disposed longitudinally within said oven, said working surface being arched from one of its sides to its other side to provide an elongated hump disposed longitudinally within said oven, conveyer means adapted to engage the opposite edges of said cellophane coverings along the opposite sides of said arched surface for simultaneously drawing said impregnated mat longitudinally over said arched surface in said oven and applying lateral tension to said coverings, whereby said impregnated mat is compressed during the curing operation to produce a substantially flat panel.

10. Apparatus for producing a fiber reinforced plastic panel including a fiber mat source of supply, means for impregnating said mat with plastic, means for covering both sides of said impregnated mat with cellophane, an elongated curing oven, an elongated working surface disposed longitudinally within said oven, said working surface being arched from one of its sides to its other side to provide an elongated hump disposed longitudinally within said oven, a pair of opposed conveyer chains on each side of said arched surface adapted to engage said cellophane coverings along their edges for simultaneously drawing said impregnated mat longitudinally over said arched surface in said oven and applying lateral tension to said coverings, whereby said impregnated mat is compressed during the curing operation to produce a substantially flat panel.

11. The method of producing a fiber reinforced plastic panel which includes the steps of impregnating a fibrous mat with plastic, sliding said impregnated fibrous mat longitudinally over an elongated working surface arched from one of its sides to its other side to provide an elongated hump disposed longitudinally along said working surface, compressing said impregnated mat against said arched surface by applying lateral tension at the opposite sides of said arched surface to the edges of a flexible covering disposed over said impregnated mat while said mat is sliding longitudinally over said arched surface, and curing said mat while said mat is thus sliding longitudinally over said arched surface.

12. The method of producing a fiber reinforced plastic panel which includes the steps of impregnating a fibrous mat with plastic, applying a flexible covering to both sides of said impregnated mat, sliding said covered, impregnated mat longitudinally over an elongated working surface arched from one of its sides to its other side to provide an elongated hump disposed longitudinally along said working surface, applying lateral tension at the opposite sides of said arched surface to the edges of said flexible coverings while said mat is sliding longitudinally over said arched surface to compress said mat against said arched surface, and curing said mat while said mat is thus sliding longitudinally over said arched surface.

13. The method of producing a fiber reinforced plastic panel which includes the steps of impregnating a fibrous mat with plastic, covering both sides of said impregnated mat with cellophane, sliding said covered, impregnated mat longitudinally over an elongated working surface arched from one of its sides to its other side to provide an elongated hump disposed longitudinally along said working surface, applying lateral tension at the opposite sides of said arched surface to the edges of said cellophane coverings while said mat is sliding longitudinally over said arched surface to compress said mat against said arched surface, and curing said mat while said mat is thus sliding longitudinally over said arched surface.

14. The method of producing a fiber reinforced plastic panel which includes the steps of impregnating a fibrous mat with plastic, covering both sides of said impregnated mat with cellophane, sliding said cellophane covered, impregnated mat longitudinally over an elongated working surface arched from one of its sides to its other side to provide an elongated hump disposed longitudinally along said working surface, applying lateral tension at the opposite sides of said arched surface to the edges of said cellophane coverings while said mat is sliding longitudinally over said arched surface to compress said mat against said arched surface, and heat treating said mat to cure said plastic while said mat is thus sliding longitudinally over said arched surface.

15. The method of producing a fiber reinforced plastic panel which includes the steps of impregnating a fibrous mat with plastic, covering both sides of said impregnated mat with cellophane which has been pre-shrunk, sliding said cellophane covered, impregnated mat longitudinally over an elongated working surface arched from one of its sides to its other side to provide an elongated hump disposed longitudinally along said working surface, applying lateral tension at the opposite sides of said arched surface to the edges of said cellophane coverings while said mat is sliding longitudinally over said arched surface to compress said mat against said arched surface, and curing said mat while said mat is thus sliding longitudinally over said arched surface.

16. The method of producing a fiber reinforced plastic panel which includes the steps of impregnating a fibrous mat with thermo-setting plastic containing a catalyst which will cause an exothermic curing cycle, covering both sides of said impregnated mat with cellophane sheets, moving said cellophane covered, impregnated mat longitudinally through an elongated, multi-stage curing oven, the first stage of said oven being relatively hot to commence the curing operation, an intermediate stage of said oven being relatively cooler so that said impregnated mat will not be overheated due to the exothermic curing cycle of the catalyst, and the final stage being relatively hot to finish the curing operation, said cellophane covered mat being moved through said oven against an elongated working surface disposed longitudinally within said oven, said working surface being arched from one of its sides to its other side to provide an elongated hump disposed longitudinally within said oven, and applying lateral tension at the opposite sides of said arched surface to the edges of said cellophane sheets while said mat is sliding longitudinally against said arched surface, whereby said impregnated mat is compressed against said arched surface during the curing operation to produce a substantially flat panel.

References Cited in the file of this patent

UNITED STATES PATENTS

| | | |
|---|---|---|
| 2,496,911 | Green | Feb. 7, 1950 |
| 2,517,698 | Muskat | Aug. 8, 1950 |
| 2,523,410 | Allard | Sept. 26, 1950 |
| 2,526,945 | Gray | Oct. 24, 1950 |
| 2,528,152 | Landgraf | Oct. 31, 1950 |
| 2,528,168 | Paulsen | Oct. 31, 1950 |